US008600365B2

(12) United States Patent
Kim

(10) Patent No.: US 8,600,365 B2
(45) Date of Patent: Dec. 3, 2013

(54) METHOD AND APPARATUS FOR MANAGING COMMUNICATION HISTORY

(75) Inventor: Suk-Soon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1049 days.

(21) Appl. No.: 12/019,771

(22) Filed: Jan. 25, 2008

(65) Prior Publication Data
US 2008/0182568 A1    Jul. 31, 2008

(30) Foreign Application Priority Data

Jan. 26, 2007 (KR) ........................ 10-2007-0008379

(51) Int. Cl.
*H04M 3/00* (2006.01)
(52) U.S. Cl.
USPC ........... 455/418; 455/551; 455/564; 455/566; 455/550.1
(58) Field of Classification Search
USPC ................ 455/412.1, 412.2, 414.1, 564–566, 455/550.1, 551, 418–420
See application file for complete search history.

(56) References Cited

U.S. PATENT DOCUMENTS

| | | | | |
|---|---|---|---|---|
| 5,675,630 A * | 10/1997 | Beatty | ............................ | 455/551 |
| 6,813,504 B2 * | 11/2004 | Benchetrit et al. | ............ | 455/461 |
| 6,947,533 B2 | 9/2005 | Okamura et al. | | |
| 7,123,946 B2 * | 10/2006 | Tsuchiyama | .................. | 455/566 |
| 7,162,275 B2 * | 1/2007 | Lee | ................................ | 455/566 |
| 7,421,287 B2 * | 9/2008 | Cho et al. | ....................... | 455/558 |
| 7,450,970 B2 * | 11/2008 | Jung | .............................. | 455/566 |
| 8,442,580 B2 * | 5/2013 | Ogren | ........................... | 455/551 |
| 2002/0019225 A1 * | 2/2002 | Miyashita | ...................... | 455/412 |
| 2002/0039914 A1 * | 4/2002 | Hama et al. | .................... | 455/566 |
| 2003/0011564 A1 * | 1/2003 | Ushino et al. | .................. | 345/156 |
| 2003/0190025 A1 * | 10/2003 | Okamura et al. | ......... | 379/142.17 |
| 2004/0017376 A1 | 1/2004 | Tagliabue et al. | | |
| 2005/0079894 A1 * | 4/2005 | Shin et al. | ...................... | 455/564 |
| 2005/0085274 A1 | 4/2005 | Lee | | |
| 2005/0141686 A1 | 6/2005 | Matsunaga et al. | | |
| 2006/0135197 A1 * | 6/2006 | Jin et al. | ...................... | 455/550.1 |
| 2006/0148528 A1 * | 7/2006 | Jung et al. | ...................... | 455/566 |

FOREIGN PATENT DOCUMENTS

| | | |
|---|---|---|
| CN | 1346225 A | 4/2002 |
| CN | 1444381 A | 9/2003 |
| EP | 1 635 543 A1 | 3/2006 |
| EP | 1 848 184 A1 | 10/2007 |
| EP | 1 860 852 A1 | 11/2007 |
| KR | 10-2007-0041911 A | 4/2007 |

* cited by examiner

*Primary Examiner* — Sharad Rampuria
(74) *Attorney, Agent, or Firm* — Jefferson IP Law, LLP

(57) ABSTRACT

A method and apparatus for managing a communication history data according to a communication mate in a mobile terminal are provided. When a received or transmitted signal is sensed, a communication mate of the received or transmitted signal is detected. Communication history data containing the detected communication mate is generated, and the communication history data is stored in a directory corresponding to the detected communication mate.

16 Claims, 5 Drawing Sheets

METHOD AND APPARATUS FOR MANAGING COMMUNICATION HISTORY

PRIORITY

This application claims the benefit under 35 U.S.C. §119 (a) of a Korean patent application filed in the Korean Intellectual Property Office on Jan. 26, 2007 and assigned Serial No. 2007-8379, the entire disclosure of which is hereby incorporated herein by reference.

BACKGROUND OF THE INVENTION

1. Field of the Invention

The present invention relates generally to a mobile terminal. More particularly, present invention relates to a method and apparatus for managing communication history data of wired and wireless communication signals transmitted and received by a mobile terminal.

2. Description of the Related Art

In general, mobile terminals are terminals, such as mobile communication terminals and Personal Digital Assistants (PDAs), which are easy to carry, that transmit and receive data, such as voice, a moving picture, and images, by wired/wireless communication, and that also make a call.

The development of communication technology has expanded mobile terminals to now include wired/wireless communication modules, such as Bluetooth, Wireless Broadband (WiBro), and Universal Serial Bus (USB), which result in receiving more wired/wireless communication signals.

However, such a mobile terminal does not generate a communication history of communication signals according to communication types. In addition, when the communication history is managed, the mobile terminal does not manage the communication history of communication signals by generating a directory corresponding to each of the communication types.

SUMMARY OF THE INVENTION

An aspect of the present invention is to address at least the above mentioned problems and/or disadvantages and to provide at least the advantages described below. Accordingly, an aspect of the present invention is to provide a method and apparatus for generating and managing communication history data for each communication mate in a mobile terminal.

According to one aspect of the present invention, a method of managing a communication history is provided. The method comprises, when a received or transmitted signal is sensed, detecting a communication mate of the received or transmitted signal, generating communication history data containing the detected communication mate, and storing the communication history data in a directory corresponding to the detected communication mate.

According to another aspect of the present invention, an apparatus for managing a communication history is provided. The apparatus comprises a memory unit for storing information on communication mates in advance, and a controller for detecting a communication mate of a received or transmitted signal when the received or transmitted signal is sensed, for generating communication history data containing the detected communication mate, and for storing the communication history data in a directory corresponding to the detected communication mate.

BRIEF DESCRIPTION OF THE DRAWINGS

The above and other aspects, features and advantages of certain exemplary embodiments of the present invention will become more apparent from the following detailed description when taken in conjunction with the accompanying drawing in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
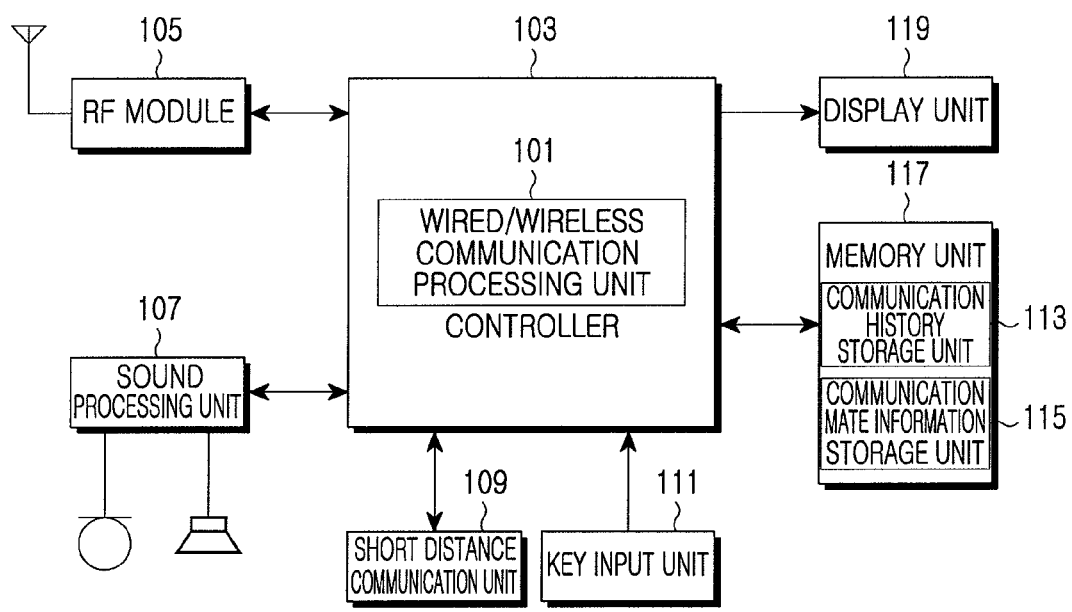
FIG. 1 is block diagram of a mobile terminal according to an exemplary embodiment of the present invention.

FIG. 1 is block diagram of a mobile terminal according to an exemplary embodiment of the present invention. Components of the mobile terminal will now be described with reference to FIG. 1.

The mobile terminal includes a controller 103, and a Radio Frequency (RF) module 105, a sound processing unit 107, a short distance communication unit 109, a key input unit 111, a memory unit 117 and a display unit 119, which are connected to the controller 103.

The RF module 105 performs a wireless communication function of the mobile terminal. The RF module 105 includes an RF transmitter (not shown) for up-converting and amplifying a frequency of a signal to be transmitted and an RF receiver (not shown) for low noise amplifying a received signal and down-converting a frequency of the low noise amplified signal. The RF module 105 also includes a transmitter (not shown) for encoding and modulating a signal to be transmitted and a receiver (not shown) for demodulating and decoding a received signal.

More particularly, in an exemplary implementation, the RF module 105 receives a multimedia message, a short message, and/or a Cell Broadcasting (CB) message. The RF module 105 also receives an arbitrary signal by means of Wireless Broadband (WiBro) that is portable wireless Internet technology and High Speed Downlink Packet Access (HSDPA) that is packet-based data communication technology.

The short distance communication unit 109 performs a short distance communication function of the mobile terminal. More particularly, in an exemplary implementation, if the short distance communication unit 109 includes a Wireless Local Area Network (WLAN) module, the mobile terminal can receive or transmit an arbitrary signal and arbitrary data by means of the WLAN module. If the short distance communication unit 109 includes a Bluetooth module, the mobile terminal can receive or transmit an arbitrary signal and arbitrary data by means of the Bluetooth module. If the short distance communication unit 109 includes a Zigbee module, the mobile terminal can receive or transmit an arbitrary signal and arbitrary data by means of the Zigbee module. If the short distance communication unit 109 includes a Universal Serial Bus (USB) module, the mobile terminal can receive or transmit an arbitrary signal and arbitrary data by means of the USB module.

The sound processing unit 107 converts a sound signal input from the controller 103 to an audible sound. The key input unit 111 includes numeric keys (including a * key and a # key) for performing mobile terminal functions and function keys for various functions, generates a key signal corresponding to a key pushed by a user, and outputs the key signal to the controller 103.

The display unit 119 displays a current state and an operational state of the mobile terminal under the control of the controller 103, and may include a Liquid Crystal Display (LCD) or Organic Light Emitting Diodes (OLED) in general.

The memory unit 117 stores data needed to control the mobile terminal. More particularly, in an exemplary implementation, the memory unit 117 includes a communication history storage unit 113 and a communication mate information storage unit 115. The communication mate information storage unit 115 of the memory unit 117 stores information on communication mates in advance according to a communication method supported by the mobile terminal.

Communication mate information includes device information of each communication mate and contains a code of a received or transmitted communication signal and a communication device name. For example, if the mobile terminal is a sender, the communication mate information includes device information of a receiver, and if the mobile terminal is a receiver, the communication mate information includes device information of a sender.

The controller 103 can search for communication mate information of a communication signal received by or transmitted from the mobile terminal from among the stored communication mate information.

The communication history storage unit 113 of the memory unit 117 includes directories that differ according to wired and wireless communication types and stores communication history data of an arbitrary wired or wireless communication signal in a corresponding directory under the control of the controller 103. Each directory included in the communication history storage unit 113 of the memory unit 117 can generate a directory for storing communication history data of an arbitrary wired or wireless communication signal or delete an arbitrary directory under the control of the controller 103.

Communication history data is data indicating a communication history of a wired or wireless communication signal received by or transmitted from the mobile terminal. In more detail, communication history data of a wired or wireless communication signal received by the mobile terminal can contain a received date, a received time, and communication mate information of the wired or wireless communication signal. Communication history data of a wired or wireless communication signal transmitted from the mobile terminal can contain a transmitted date, a transmitted time, and a recipient of the wired or wireless communication signal.

Figure 2:
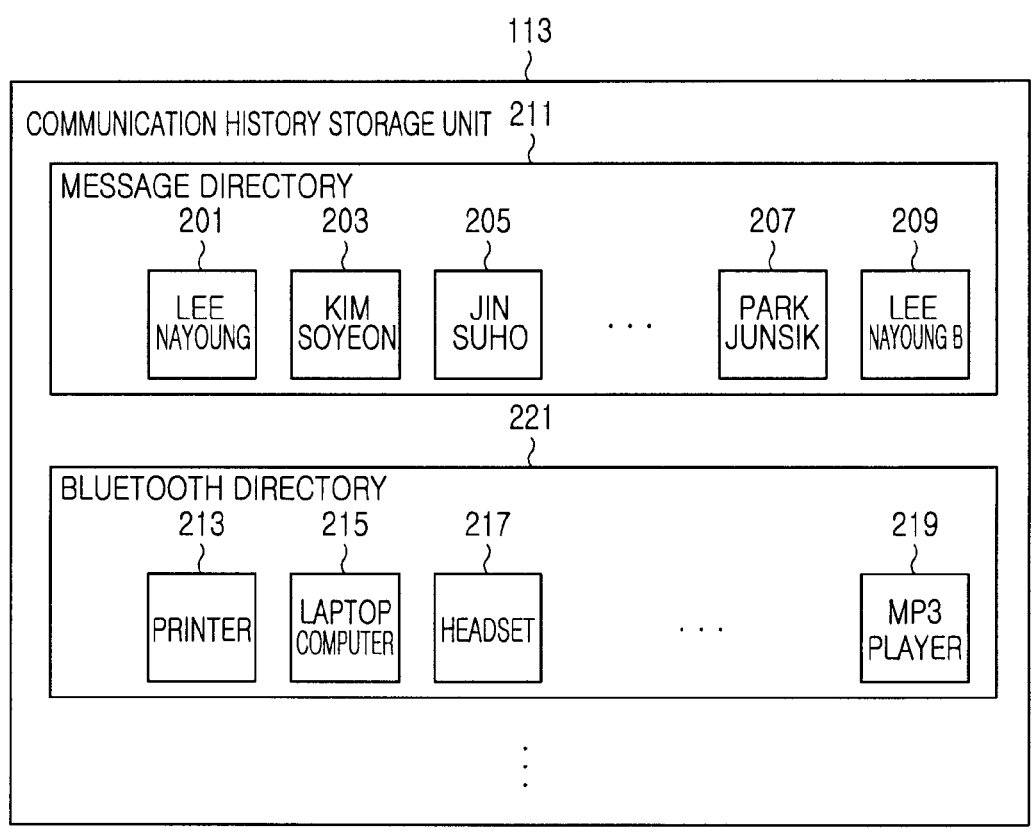
FIG. 2 is an internal configuration of a communication history storage unit according to an exemplary embodiment of the present invention.

FIG. 2 is an internal configuration of the communication history storage unit 113 according to an exemplary embodiment of the present invention. It will now be described with reference to FIGS. 1 and 2 that the communication history storage unit 113 includes directories different according to wired and wireless communication types.

As illustrated in FIG. 2, the communication history storage unit 113 can include a message directory 211 and a Bluetooth directory 221 according to wired and wireless communication types. The directories corresponding to wired and wireless communication types are called upper-layer directories. An arbitrary upper-layer directory can include at least one directory generated in advance to correspond to communication mate information. The directories generated to correspond to communication mate information are called lower-layer directories.

In FIG. 2, the message directory 211 includes directories, such as Lee Nayoung 201, Kim Soyeon 203, Jin Suho 205, Park Junsik 207, Lee Nayoung B 209, etc., as lower-layer directories, each corresponding to a sender or recipient name contained in communication mate information. The Bluetooth directory 221 includes directories, such as printer 213, laptop computer 215, headset 217, MP3 player 219, etc., as lower-layer directories, each corresponding to a communication device name contained in communication mate information.

Here, Lee Nayoung 201 and Lee Nayoung B 209 are achieved in a method of differently displaying lower-layer directory names to distinguish the same sender or recipient name information from each other. Although the duplicated names are distinguished using alphabet in FIG. 2, the duplicated names can be distinguished using at least one of a number, alphabet, a special sign and a special character. In addition, when duplicated sender name information is output, the mobile terminal can inform the user of different sender names by displaying different colors for the duplicated sender names.

The communication history storage unit 113 may further include upper-layer directories corresponding to all wired and wireless communication types supported by the mobile terminal. Although the communication history storage unit 113 includes only the message directory 211 and the Bluetooth directory 221 in FIG. 2, the communication history storage unit 113 may further include a Zigbee directory (not shown), an HSDPA directory (not shown), a CB message directory (not shown) and the like.

Referring back to FIG. 1, the controller 103 controls the components of the mobile terminal in order to perform various functions of the mobile terminal. In particular, in the current exemplary embodiment, a wired/wireless communication processing unit 101 of the controller 103 senses a wired or wireless communication signal received or transmitted by means of the RF module 105 or the short distance communication unit 109. The wired/wireless communication processing unit 101 can search for communication mate information of the sensed wired or wireless communication signal from among the communication mate information stored in the communication mate information storage unit 115 of the memory unit 117.

For example, the wired/wireless communication processing unit 101 can detect a code related to a wired or wireless communication signal from among the communication mate information stored in the communication mate information storage unit 115 of the memory unit 117 and search for communication mate information corresponding to the detected code.

For another example, when phonebook data is stored in the communication mate information storage unit 115 of the memory unit 117 and a short message is received by means of the RF module 105, the wired/wireless communication processing unit 101 of the controller 103 can search for an originating number contained in the short message and search for a sender corresponding to the found originating number from the phonebook data.

For another example, when the communication mate information storage unit 115 of the memory unit 117 stores Bluetooth communication mate information and a Bluetooth signal is received by means of the short distance communication unit 109, the wired/wireless communication processing unit 101 of the controller 103 can detect an arbitrary device type code from the Bluetooth signal. The communication mate information can contain all kinds of device type information supported by a Bluetooth communication method. The wired/wireless communication processing unit 101 can search for communication mate information corresponding to the detected device type code from among the pre-stored communication mate information and search for a device name of a communication mate by analyzing the found communication mate information.

The wired/wireless communication processing unit 101 generates a communication history containing the found communication mate information. For example, if a wired or wireless communication signal is received, the wired/wireless communication processing unit 101 can search for communication mate information and confirm a received date and time of the wired or wireless communication signal. The wired/wireless communication processing unit 101 can generate a communication history containing the found communication mate information and the confirmed date and time.

For another example, if a short message signal is received, the wired/wireless communication processing unit 101 can search for a sender and confirm a received date and time of the short message signal. The wired/wireless communication processing unit 101 can generate a communication history containing the found sender and the confirmed date and time.

For another example, if a Bluetooth signal is received, the wired/wireless communication processing unit 101 can search for a device name of a communication mate connected in the Bluetooth communication method and confirm a received date and time of the Bluetooth signal. The wired/wireless communication processing unit 101 can generate a communication history containing the found device name and the confirmed date and time.

The wired/wireless communication processing unit 101 searches for an upper-layer directory corresponding to a currently received wired/wireless communication type from the communication history storage unit 113 of the memory unit 117. The upper-layer directory can include at least one lower-layer directory. The wired/wireless communication processing unit 101 determines whether the found upper-layer directory includes a lower-layer directory corresponding to the communication mate information. If it is determined that the found upper-layer directory includes a lower-layer directory corresponding to the communication mate information, the wired/wireless communication processing unit 101 stores the communication history data in the lower-layer directory. If it is determined that the found upper-layer directory does not include a lower-layer directory corresponding to the communication mate information, the wired/wireless communication processing unit 101 generates a lower-layer directory corresponding to the communication mate information and stores the communication history data in the generated lower-layer directory.

For example, if a short message signal is received, the wired/wireless communication processing unit 101 can search for an upper-layer directory pre-defined to correspond to the short message signal. The wired/wireless communication processing unit 101 also can determine whether the found upper-layer directory includes a lower-layer directory corresponding to an originating name of the short message signal. If it is determined that the found upper-layer directory includes the lower-layer directory, the wired/wireless communication processing unit 101 can store communication history data corresponding to the short message signal in the lower-layer directory. If it is determined that the found upper-layer directory does not include the lower-layer directory, the wired/wireless communication processing unit 101 can generate a lower-layer directory corresponding to the originating name in the upper-layer directory and store the communication history data corresponding to the short message signal in the generated lower-layer directory.

For another example, if a Bluetooth signal is received, the wired/wireless communication processing unit 101 can search for an upper-layer directory pre-defined to correspond to the Bluetooth signal. The wired/wireless communication processing unit 101 also can determine whether the found upper-layer directory includes a lower-layer directory corresponding to a device name of a communication mate. If it is determined that the found upper-layer directory includes the lower-layer directory, the wired/wireless communication processing unit 101 can store communication history data corresponding to the Bluetooth signal in the lower-layer directory. If it is determined that the found upper-layer directory does not include the lower-layer directory, the wired/wireless communication processing unit 101 can generate a lower-layer directory corresponding to the device name of the communication mate in the upper-layer directory and store the communication history data corresponding to the Bluetooth signal in the generated lower-layer directory.

Thereafter, if the user requests to output communication history data, the controller 103 can search for and output the requested communication history data from among directories generated to correspond to wired and wireless communication types. In more detail, the controller 103 outputs an upper-layer directory list containing all upper-layer directory names corresponding to the wired and wireless communication types from the communication history storage unit 113 of the memory unit 117. The controller 103 receives an arbitrary upper-layer directory name from among the output upper-layer directory list, which is selected by the user. The controller 103 searches for an upper-layer directory corresponding to the selected upper-layer directory name and outputs all lower-layer directory names included in the found upper-layer directory. The controller 103 receives an arbitrary lower-layer directory name from among the output lower-layer directory names, which is selected by the user, searches for a lower-layer directory corresponding to the selected lower-layer directory name, and outputs all pieces of communication history data included in the found lower-layer directory.

Figure 3:
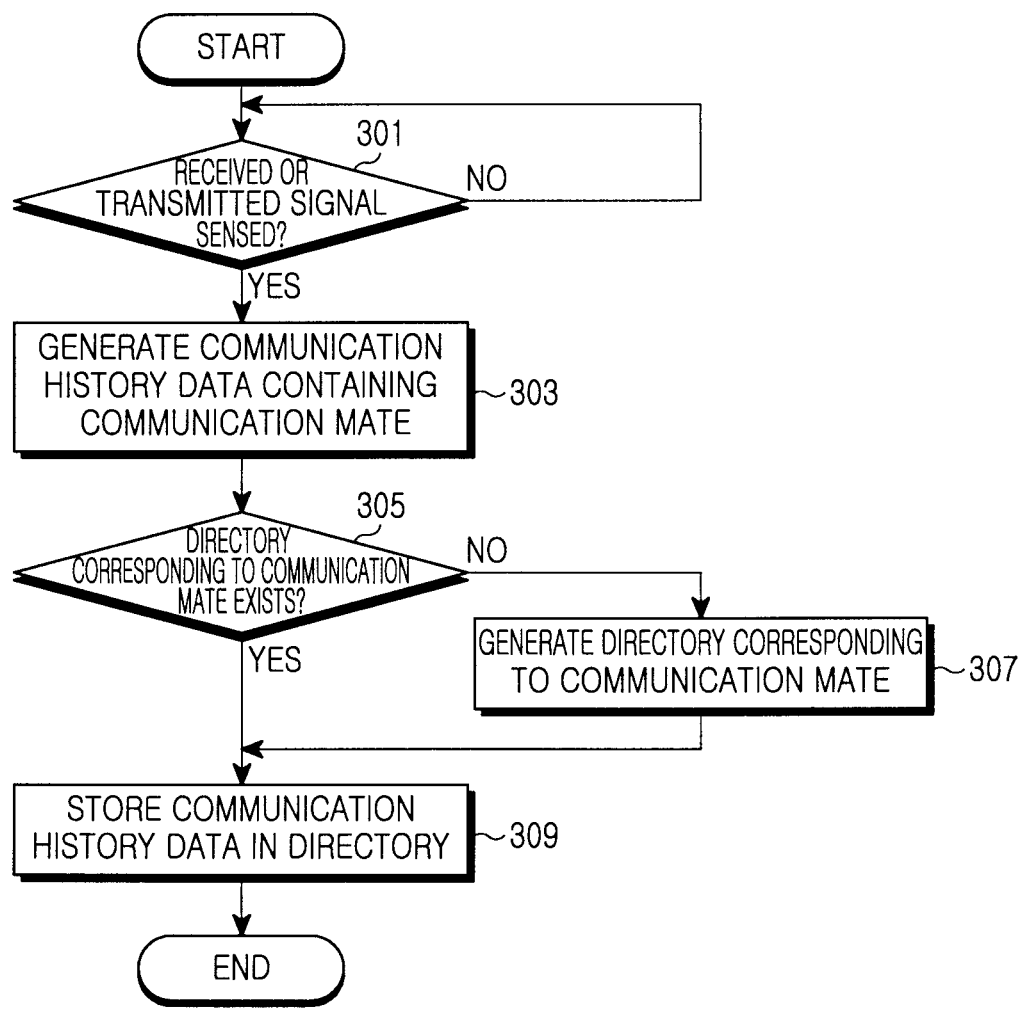
FIG. 3 is a flowchart of a process of storing communication history data in a directory in a mobile terminal according to an exemplary embodiment of the present invention.

FIG. 3 is a flowchart of a process of storing communication history data in a directory in a mobile terminal according to an exemplary embodiment of the present invention. An exemplary process of generating communication history data according to a wired or wireless communication signal and storing the generated communication history data in a directory will now be described with reference to FIGS. 1 to 3.

If the controller 103 senses a communication signal received by or transmitted from the mobile terminal in step 301, the process proceeds to step 303, otherwise, the process repeats step 301.

When the received or transmitted signal is sensed, the controller 103 searches for communication mate information of the received or transmitted signal and generates communication history data of the received or transmitted signal in step 303.

For example, if a received wired or wireless communication signal is a short message signal, the controller 103 can search for a name of a sender from communication mate information storage unit 115 of the memory unit 117 and confirm a received date and time of the wired or wireless communication signal. The controller 103 can generate communication history data containing the found sender's name and the received date and time of the short message signal.

For another example, if a wired or wireless communication signal to be transmitted is a short message signal, the controller 103 can search for a name of a recipient from communication mate information storage unit 115 of the memory unit 117 and confirm a transmitted date and time of the wired or wireless communication signal. The controller 103 can generate communication history data containing the found recipient's name and the transmitted date and time of the short message signal.

The controller 103 determines in step 305 whether a directory corresponding to the communication mate information found in step 303 is included in the communication history storage unit 113 of the memory unit 117. If it is determined in step 305 that a directory corresponding to the communication mate information found in step 303 is included in the communication history storage unit 113 of the memory unit 117, the process proceeds to step 309, otherwise the process proceeds to step 307.

For example, if the communication history storage unit 113 includes upper-layer directories generated according to wired and wireless communication types and an upper-layer directory includes a lower-layer directory corresponding to communication mate information, the controller 103 can determine a transmitted or received wired or wireless communication type. The controller 103 can search for an upper-layer directory corresponding to the determined wired or wireless communication type. The controller 103 can search for a lower-layer directory corresponding to the communication mate information from among lower-layer directories included in the found upper-layer directory. If a lower-layer directory corresponding to the communication mate information is not found, the controller 103 can proceed to step 307. If a lower-layer directory corresponding to the communication mate information is found, the controller 103 can proceed to step 309.

The controller 103 generates a directory corresponding to the communication mate information in the communication history storage unit 113 in step 307.

For example, after searching for an upper-layer directory corresponding to a wired or wireless communication type, the controller 103 can generate a lower-layer directory corresponding to the communication mate information of the wired or wireless communication signal.

For another example, if a lower-layer directory corresponding to a sender's name of a short message received by the controller 103 is not found, the controller 103 can generate a lower-layer directory corresponding to the sender's name. When the lower-layer directory is generated, the controller 103 can assign the sender's name as a name of the lower-layer directory. Alternatively, the controller 103 can assign a symbol, a telephone number of the sender or a group name of the sender as the lower-layer directory name.

The controller 103 searches for a directory corresponding to the communication mate information and stores the communication history data generated in step 303 in the found directory in step 309.

For example, the controller 103 can search for a lower-layer directory corresponding to the communication mate information of the wired or wireless communication signal and store the communication history data generated in step 303 in the found lower-layer directory.

For another example, if the lower-layer directory name is assigned using a name of a sender or recipient, the controller 103 can search for a lower-layer directory having the same name as the name of the sender or recipient of the short message signal. The controller 103 can store the communication history data generated in step 303 in the found lower-layer directory.

A process of automatically generating a directory for storing communication history data in a mobile terminal has been described. Alternatively, a directory for storing communication history data of an arbitrary communication signal can be generated by a request of a user.

Figure 4:
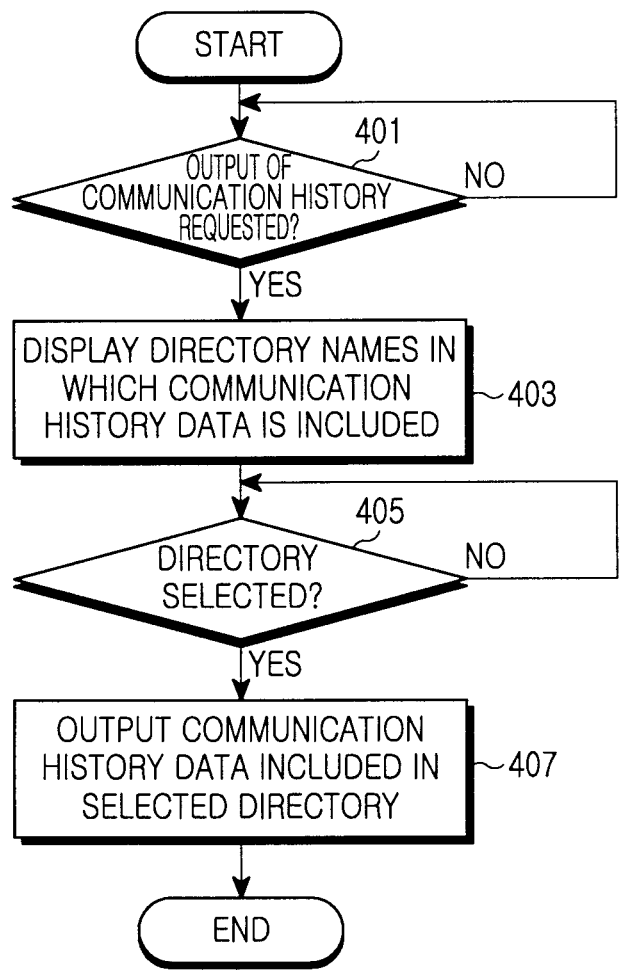
FIG. 4 is a flowchart of a process of outputting communication history data in a mobile terminal according to an exemplary embodiment of the present invention.

FIG. 4 is a flowchart of a process of outputting communication history data in a mobile terminal according to an exemplary embodiment of the present invention. A process of outputting communication history data requested by a user in a mobile terminal will now be described with reference to FIGS. 1 to 4.

If the user requests to output communication history data in step 401, the controller 103 proceeds to step 403, otherwise the controller 103 repeats step 401 until the user requests to output communication history data.

The controller 103 displays a list of directories included in the communication history storage unit 113 of the memory unit 117 in step 403.

For example, if the communication history storage unit 113 includes upper-layer directories generated according to wired and wireless communication types and an upper-layer directory includes a lower-layer directory corresponding to communication mate information, the controller 103 can display a list of the upper-layer directories. When the upper-layer directory list is displayed, the controller 103 can display upper-layer directory names as they are.

For another example, if upper-layer directories included in the communication history storage unit 113 are the message directory 211, the Bluetooth directory 221 and a Zigbee directory (not shown), when the controller 103 displays an upper-layer directory list, the controller 103 can display the upper-layer directory list containing message, Bluetooth and Zigbee directory names.

The controller 103 determines in step 405 whether the user selects an arbitrary directory from among the directory list displayed in step 403. If it is determined in step 405 that the user selects an arbitrary directory, the controller 103 proceeds to step 407, otherwise the controller 103 repeats step 405 until the user selects an arbitrary directory.

For example, if an upper-layer directory list is displayed, the controller 103 can receive an arbitrary upper-layer directory from the displayed upper-layer directory list, which is selected by the user. The controller 103 can display a list of lower-layer directories included in the selected upper-layer directory. The controller 103 can determine whether the user selects an arbitrary lower-layer directory from the displayed lower-layer directory list. If the user selects an arbitrary lower-layer directory, the controller 103 can proceed to step 407, otherwise the controller 103 can repeat step 405.

The controller 103 searches for communication history data included in the directory selected in step 405 and outputs the found communication history data in step 407.

For example, if an arbitrary lower-layer directory is selected from a lower-layer directory list, the controller 103 can search for and output communication history data included in the selected lower-layer directory.

For another example, if a lower-layer directory list including directory names, such as Lee Nayoung 201, Kim Soyeon 203, Jin Suho 205, Park Junsik 207, and Lee Nayoung B 209, included in the message directory 211 that is an upper-layer directory is displayed and the Jin Suho directory 205 is selected, the controller 103 can output communication history data included in the Jin Suho directory 205.

Figure 5:
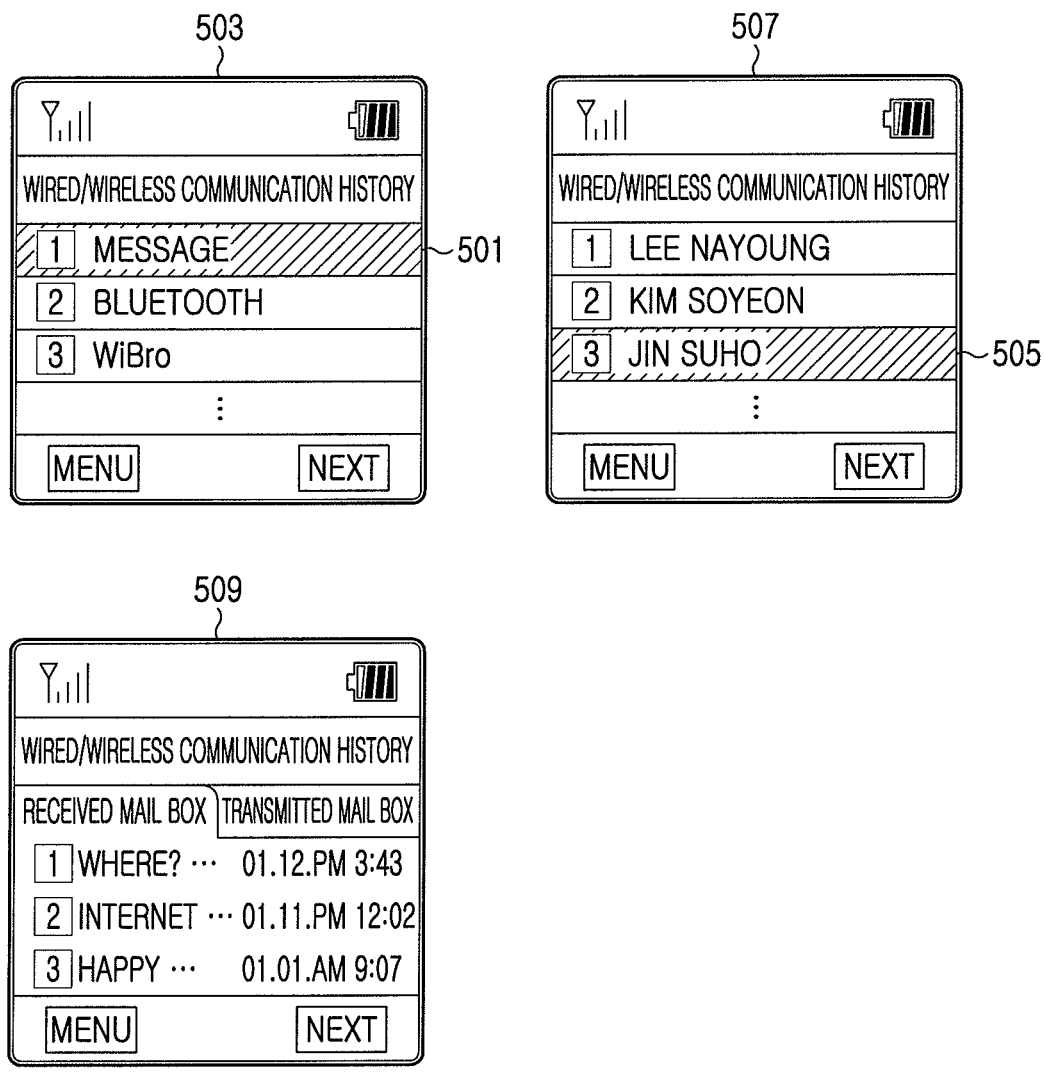
FIG. 5 illustrates screens of a mobile terminal outputting communication history data according to an exemplary embodiment of the present invention.

FIG. 5 illustrates screens of a mobile terminal outputting communication history data according to an exemplary embodiment of the present invention. A process of outputting communication history data in the mobile terminal will now be described with reference to FIGS. 1 to 5.

As an exemplary implementation, it is assumed that the communication history storage unit 113 of the memory unit 117 includes upper-layer directories generated according to wired and wireless communication types and an upper-layer directory includes a lower-layer directory corresponding to communication mate information.

If the user requests to output a communication history, the controller 103 can display a list of upper-layer directories, such as memory, Bluetooth, Wibro, etc., which are wired and wireless communication types supported by the mobile terminal, as shown in a screen 503. If 'No. 1 message' 501 is selected by the user, the controller 103 can display a list of lower-layer directories, such as Lee Nayoung 201, Kim Soyeon 203, Jin Suho 205, etc., included in the message directory 211 as shown in a screen 507. If 'No. 3 Jin Suho' 505 is selected by the user, the controller 103 can search for communication history data included in the lower-layer directory Jin Suho 205 and display the found communication history data as shown in a screen 509. If a received mail box is selected by the user, the controller 103 can display a communication history of messages received from communication mate information 'Jin Suho', and if a transmitted mail box is selected by the user, the controller 103 can display a communication history of messages transmitted to a recipient 'Jin Suho'.

Through the above-described procedures, a mobile terminal can generate communication history data of a received or transmitted wired or wireless communication signal and store the generated communication history data in a directory distinguished according to communication mate information of the wired or wireless communication signal While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of managing a communication history, the method comprising:
   detecting a name of a communication mate corresponding to a received or transmitted signal from device information on communication mates stored in a memory unit in advance;
   generating communication history data containing the name of the communication mate detected in the memory unit; and
   determining whether a lower-layer directory corresponding to the detected name of the communication mate exists;
   if it is determined that the directory exists, storing the communication history data in the lower-layer directory corresponding to the detected name of the communication mate,
   wherein the lower-layer directory is included in one of at least two upper-layer directories corresponding to at least two communication types, each of the at least two upper-layer directories comprises at least two lower-layer directories corresponding to at least two communication mates, and
   the lower-layer directory has the same name as the name of the communication mate detected in the memory unit.

2. The method of claim 1, wherein the storing of the communication history data further comprises:
   if it is determined that the lower-layer directory does not exist, generating a lower-layer directory corresponding to the detected name of the communication mate in the one of at least two upper-layer directories; and
   storing the communication history data in the generated lower-layer directory.

3. The method of claim 1, wherein the at least two communication types are at least two of a message communication method, a Wireless Broadband (WiBro) communication method, a Bluetooth communication method, a Zigbee communication method and a Universal Serial Bus communication method.

4. The method of claim 1, further comprising generating an arbitrary lower-layer directory according to a request of a user.

5. The method of claim 4, wherein the generating of the arbitrary lower-layer directory comprises generating a name of the directory by using at least one of a symbol and a name of the communication mate.

6. The method of claim 5, wherein the generating of the arbitrary lower-layer directory comprises a name of the directory by mixing at least one of numbers, alphabet, special signs and special characters.

7. The method of claim 1, further comprising:
   if the user requests to output the communication history data, searching for a lower-layer directory containing the communication history data; and
   outputting the communication history data contained in the found lower-layer directory.

8. The method of claim 2, further comprising:
   if the user requests to output the communication history data, searching for a lower-layer directory containing the communication history data; and
   outputting the communication history data contained in the found lower-layer directory.

9. An apparatus for managing a communication history, the apparatus comprising:
   a memory unit for storing device information of communication mates in advance; and
   a controller for detecting a name of a communication mate of a received or transmitted signal from the device information stored in the memory unit, for generating communication history data containing the name of the communication mate detected in the memory unit, for determining whether a lower-layer directory corresponding to the detected name of the communication mate exists, and
   if it is determined that the directory exists, for storing the communication history data in the lower-layer directory corresponding to the detected name of the communication mate,
   wherein the lower-layer directory is included in one of at least two upper-layer directories corresponding to at least two communication types, each of the at least two upper-layer directories comprises at least two lower-layer directories corresponding to at least two communication mates, and the lower-layer directory has the same name as the name of the communication mate detected in the memory unit.

10. The apparatus of claim 9, wherein if it is determined that the lower-layer directory does not exist, the controller generates a lower-layer directory corresponding to the detected name of the communication mate in the one of at least two upper-layer directories and stores the communication history data in the generated lower-layer directory.

11. The apparatus of claim 9, wherein the controller generates an arbitrary lower-layer directory according to a request of a user.

12. The apparatus of claim 11, wherein the controller generates a name of the lower-layer directory by using at least one of a symbol and a name of the communication mate.

13. The apparatus of claim 12, wherein the controller generates a name of the lower-layer directory by mixing at least one of numbers, alphabet, special signs and special characters.

14. The apparatus of claim 9, wherein at least two communication types are at least two of a message communication method, a Wireless Broadband (WiBro) communication method, a Bluetooth communication method, a Zigbee communication method and a Universal Serial Bus communication method.

15. The apparatus of claim 9, wherein if the user requests to output the communication history data, the controller searches for a lower-layer directory containing the communication history data and outputs the communication history data contained in the found lower-layer directory.

16. The apparatus of claim 10, wherein if the user requests to output the communication history data, the controller searches for a lower-layer directory containing the communication history data and outputs the communication history data contained in the found lower-layer directory.

\* \* \* \* \*